Aug. 16, 1966 K. STEINERT ET AL 3,266,856
SEALED NEEDLE ROLLER BEARING
Filed Oct. 7, 1964
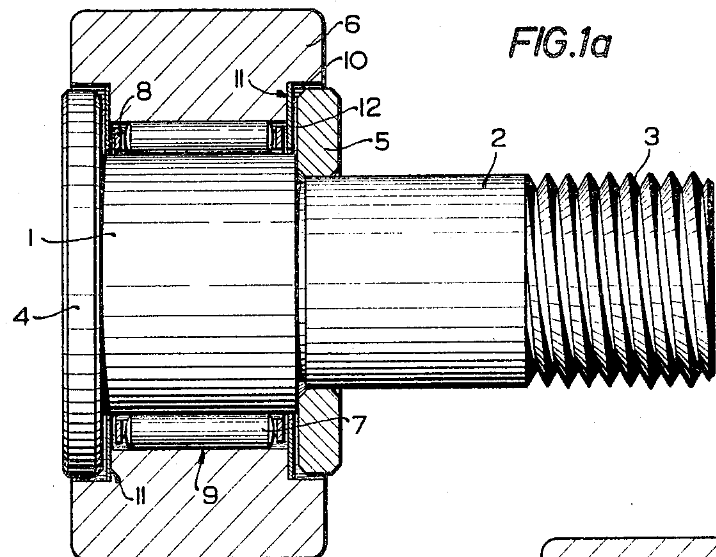
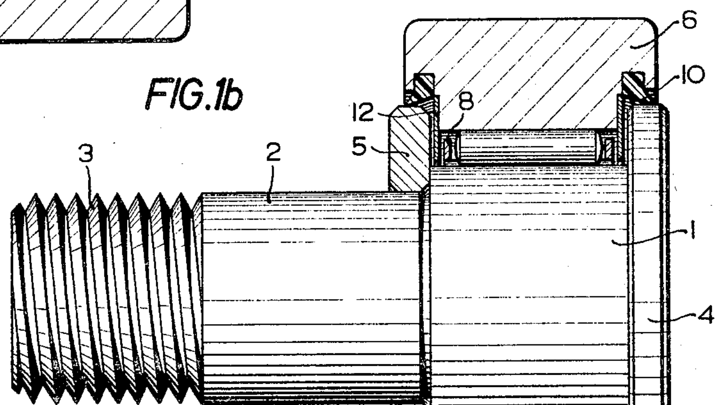
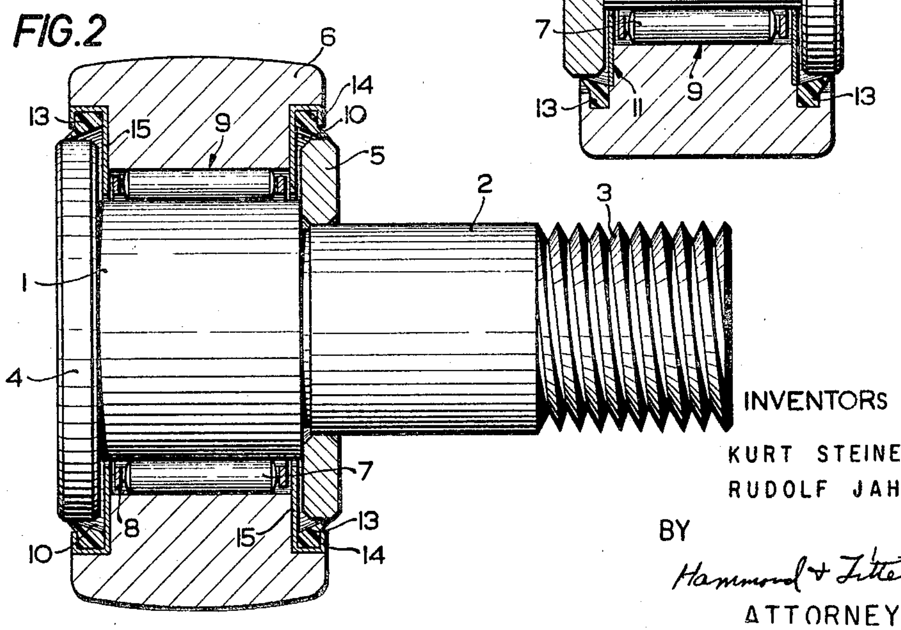
INVENTORS
KURT STEINERT
RUDOLF JAHN
BY
Hammond & Littell
ATTORNEYS

United States Patent Office 3,266,856
Patented August 16, 1966

1

3,266,856

SEALED NEEDLE ROLLER BEARING

Kurt Steinert and Rudolf Jahn, Herzogenaurach, Germany, assignors to Industriewerk Schaeffler Ohg., Herzogenaurach, Germany, a corporation of Germany Filed Oct. 7, 1964, Ser. No. 402,143
Claims priority, application Germany, Oct. 18, 1963, J 24,588
2 Claims. (Cl. 308—187.1)

The invention relates to sealed needle roller bearings comprised of an outer race with recesses at both ends set back from the raceway surface, an inner race with fixed or fitted-on collar for engaging in the outer race recesses and a plurality of cylindrical rollers arranged and guided between the races and preferably guided in a cage.

Such needle bearings have been used for supporting or cam-follower with the collars on the inner race being used as abutment discs for the outer race. Such bearings are difficult to seal since the lubricant contained in the bearings, because the recesses at the two ends of the outer race are set back from the raceway surface, tends to move away from the raceway into the recesses during operation and it is then projected radially away from the recesses. To prevent this, it has been proposed to arrange lipped sealing members in the recesses which sealing members bear against the collars on the inner race. However, these sealing members have been found to be inadequate, particularly at high rotational speeds.

It is an object of the invention to provide novel sealed roller bearings in which lubricant is not lost by centrifugal force.

It is another object of the invention to provide novel sealed roller bearings with recessed outer races which are sealed against entry of foreign matter.

These and other objects and advantages of the invention will become obvious from the following detailed description.

The sealed roller bearing of the invention is comprised of an outer race with recesses at both ends set back from the raceway surface, an inner race with collars for engaging in the said outer race recesses, a plurality of cylindrical rollers arranged and guided between the races and thin-walled discs affixed to the end faces of the outer race recesses adjacent the collars on the inner race whose inner diameters are adapted to the raceway diameter of the inner race so that sealing gaps are formed. By this construction, the lubricant space between the roller raceways is closed off by the thin-walled discs on the outer race in such a manner that the lubricant can no longer issue from the chamber as a result of centrifugal force but is retained securely therein.

The thin-walled discs can be affixed to the end faces of the recesses in the outer race in any suitable manner. For example, they may be glued or bonded to the end face or they may be made to bear in a particularly simple manner at their peripheries, with preload, against the bores of the recesses in the outer race.

Elastic lipped sealing members may also be arranged in a known manner in grooves encircling the recesses in the outer race whereby the sealing lips of the said members bear against the surfaces of the collars on the inner race. Although the lipped-sealing members cannot in practice further improve the sealing against the escape of the lubricant which is provided by the arrangement of the

2 thin-walled discs, the said additional sealing members do provide a seal against the entry of foreign dirt particles into the bearing.

When an additional lipped sealing means is provided, a particularly simple and convenient construction is obtained by pressing into the open-end recesses in the outer race sheet metal rings having a U-shaped cross-section and whose limbs face towards the interior of the bearing and are adapted to the raceway diameter of the inner race so that sealing gaps are provided. Between the said limbs are the elastic lipped sealing means whose sealing lips bear against the surface of the collars on the inner race. In this construction, a relatively simple sheet metal part and an additional lipped sealing means provide a satisfactory seal against the escape of lubricant and the entry of dirt particles. Through the simplicity of this sealing arrangement, an entirely satisfactory sealing result is obtained and the said sealing means has the further great advantage of not substantially increasing the bearing dimensions.

Referring now to the drawings:

FIGS. 1*a*, 1*b* and 2 show longitudinal sectional views of three embodiments of the invention.

FIGURES 1*a*, 1*b* and 2 show the application of the invention to a so-called "cam-follower." The inner raceway 1 for the rollers is a part of a bolt 2 which may have a screwthread 3 at one end and at its other end is provided with a fixed collar 4. At its other end the raceway 1 is bounded by a press-fitted collar 5 which when the curve-roller is fitted is held in its position also by the component part accommodating the bolt 2. An outer race 6 serving as a roller is mounted on the bolt 2 with the interposition of rollers 7 which are guided in a cage 8. The outer race 6 is provided at both ends with recesses 10 which are set back relative to the roller raceway 9 and into which the collars 4 and 5 on the bolt 2 engage. This construction fixes the outer race or roller 6 in the axial direction on the bolt 2.

FIGS. 1*a* and 1*b* show different constructional embodiment. In the construction shown in FIG. 1*a*, thin-walled discs 12 are fixed to the end faces 11 of the recesses 10 nearest the collars 4 and 5. The discs 12 may be fixed, for example, by gluing or bonding, but they may also be made to bear at their peripheries with some preload against the bores of the recesses 10.

Another construction is shown in FIG. 1*b* wherein in addition to the discs 12 there are elastic lipped-sealing member 13 in grooves encircling the recesses 10 whose sealing lips bear against the surfaces of the collars 4 and 5. The lipped-sealing members 13 provide an additional seal against the penetration of dirt particles.

FIG. 2 shows a particularly neat construction for a needle roller bearing wherein, as shown in FIG. 1*b*, additional lipped-sealing members are provided. This advantageous construction is obtained by pressing sheet metal rings 14 of U-shaped cross-section into the recesses in the outer race 6. The inner diameters of the limbs 15 of the said rings 14 which are directed towards in the interior of the bearing are so adapted to the diameter of the raceway 1 as to provide sealing gaps. Lipped-sealing members 13 are inserted between the two limbs of the U-shaped sheet metal ring 14 and the sealing lips of the sealing members bearing against the collars 4 and 5.

Various modifications of the bearings of the invention may be made without departing from the spirit or scope thereof and it is to be understood that the invention is to be liimted only as defined in the appended claims.

We claim:

1. A sealed needle roller bearing comprising an outer race with recesses at both ends set back from the raceway surface, an inner race with collars for engaging in the said outer race recesses, a plurality of cylindrical rollers arranged and guided between the races, U-shaped cross-section sheet metal rings pressed into the open-end recesses of the outer race, whereby the limbs of the U-shaped rings are directed toward the interior of the bearing and adapted to the raceway diameter of the inner race to form sealing gaps and elastic lipped sealing means between the limbs of the U-shaped rings whose sealing lips bear against the surface of the collars on the inner race.

2. The bearing of claim 1 wherein the cylindrical rollers are guided in a cage.

References Cited by the Examiner

UNITED STATES PATENTS 3,120,983 2/1964 Sommer __________ 308—187.1

FOREIGN PATENTS 1,754,740 8/1957 Germany.
1,835,256 5/1961 Germany.

DAVID J. WILLIAMOWSKY, *Primary Examiner.*

FRANK SUSKO, *Examiner.*